United States Patent
Guey

(10) Patent No.: US 6,480,556 B1
(45) Date of Patent: Nov. 12, 2002

(54) RATE DETECTION APPARATUS AND METHOD FOR VARIABLE RATE SPEECH ENCODING

(75) Inventor: Jiann-Ching Guey, Durham, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/300,184

(22) Filed: Apr. 27, 1999

(51) Int. Cl.⁷ .................. H04B 17/00; H03M 13/37
(52) U.S. Cl. .................. 375/343; 375/225; 375/340; 714/796
(58) Field of Search ............... 375/225, 227, 375/262, 265, 340, 341, 343; 714/794, 795, 796

(56) References Cited

U.S. PATENT DOCUMENTS

| | | | | |
|---|---|---|---|---|
| 5,566,206 A | * | 10/1996 | Butler et al. | 375/225 |
| 5,638,408 A | * | 6/1997 | Takaki | 375/341 |
| 5,689,511 A | * | 11/1997 | Shimazaki et al. | 370/545 |
| 5,757,850 A | * | 5/1998 | Takaki | 375/225 |
| 5,774,496 A | | 6/1998 | Butler et al. | 375/225 |
| 5,907,586 A | * | 5/1999 | Katsuragawa et al. | 375/341 |
| 6,112,325 A | * | 8/2000 | Burshtein | 714/774 |
| 6,137,840 A | * | 10/2000 | Tiedemann, Jr. et al. | 375/297 |
| 6,175,590 B1 | * | 11/2000 | Black et al. | 370/209 |
| 6,202,188 B1 | * | 3/2001 | Suzuki et al. | 714/758 |

FOREIGN PATENT DOCUMENTS

| | | |
|---|---|---|
| GB | 2 301 999 A | 12/1996 |
| WO | WO 99/08425 | 2/1999 |
| WO | WO 00/16512 | 3/2000 |

* cited by examiner

*Primary Examiner*—Young T. Tse
(74) *Attorney, Agent, or Firm*—Coats & Bennett, P.L.L.C.

(57) ABSTRACT

A method of detecting the data rate of a received digital signal is provided. The method generally includes the steps of decoding a received signal at each of a plurality of possible rates to produce a plurality of decoded bit sequences and a corresponding plurality of correlation metrics, one for each of the plurality of different rates. Quality checks are performed on the plurality of decoded bit sequences producing a plurality of quality check indication signals, one for each of the plurality of different rates. The pluralities of correlation metrics and quality check indication signals are analyzed and the data rate of the received signal is determined based on a novel decision process.

20 Claims, 7 Drawing Sheets

RATE DETECTION APPARATUS AND METHOD FOR VARIABLE RATE SPEECH ENCODING

FIELD OF THE INVENTION

The present invention is directed toward detecting the rate of a variable-rate digital signal and, more particularly, toward detecting the rate of a variable-rate digital signal without an explicit indication from the transmitting source.

BACKGROUND OF THE INVENTION

In digital communication systems, a transmitter may utilize variable-rate speech vocoders capable of encoding digital data signals at different rates depending on various parameters. Transmitter vocoders typically encode data for formatting into data frames of various data rates, with each frame being twenty milli-seconds in duration. For example, where the digital data signal is a voice data signal, the transmitter vocoder may select a rate in response to the amount of voice activity contained in each voice data frame in an effort to minimize interference to other users in the system. Rate information for each frame is generally not transmitted with the speech signal and, accordingly, the receiver must be able to determine the rate of each frame in order to be able to properly reconstruct the speech signal.

An IS-95 communication system is one such communication system in which variable-rate speech vocoders are employed. Generally, an IS-95B voice traffic channel is capable of supporting two rate sets, with each rate set including a plurality of data transmission rates. For example, rate set 1 can transmit encoded data at four different frame rates, namely, 9600 bps, 4800 bps, 2400 bps, and 1200 bps. Similarly, rate set 2 can transmit encoded data at four different frame rates, namely, 14400 bps, 7200 bps, 3600 bps, and 1800 bps.

The highest data frame rates (9600 and 14400 bps) are generally referred to as "full-rate" frames; the second highest data frame rates (4800 and 7200 bps) are generally referred to as "half-rate" frames; the third highest data frame rates (2400 and 3600 bps) are generally referred to as "quarter-rate" frames; and the lowest data frame rates (1200 and 1800 bps) are generally referred to as "eighth-rate" frames. During call set up, one rate set is selected according to system preference. Within the call transmission, the data rate can change from one twenty milli-second frame to the next. Since rate information for each frame is not transmitted, the receiver needs to determine whether to erase a received frame, or, if the receiver decides to accept the frame, the rate at which the frame has been transmitted in order to properly reconstruct the voice information.

One known method of determining the data rate of a received digital signal decodes the received data frame at each of the four possible rates within a preselect rate set. The decoded bits are then re-encoded and compared with the un-decoded data bits. The number of bit errors serves as an indication of the likelihood that the received frame belongs to the corresponding rate. In addition to the re-encoded bit errors, CRC (Cyclic Redundancy Check) check indicator bits for the two highest frame rates, and Yamamoto Quality Metrics for the two lowest frame rates, are also generated and utilized in making the final decision. Using this information and ten predetermined thresholds, a microprocessor determines the rate at which the received data is encoded using a complicated binary decision tree. Extensive simulation and fine tuning are necessary in order to properly optimize the ten thresholds.

The present invention is directed toward overcoming one or more of the above-mentioned problems.

SUMMARY OF THE INVENTION

A method of detecting the data rate of a received digital signal is provided. The method generally includes the steps of decoding a received signal at each of a plurality of possible rates to produce a plurality of decoded bit sequences and a corresponding plurality of correlation metrics, one for each of the plurality of different rates. Quality checks are performed on the plurality of decoded bit sequences producing a plurality of quality check indication signals, one for each of the plurality of different rates. The pluralities of correlation metrics and quality check indication signals are analyzed and the data rate of the received signal is determined based on a novel decision process.

In one form, the analyzing step includes the steps of comparing various ratios of the plurality of correlation metrics with respective threshold values, and determining the data rate of the received signal based on the comparison. The quality check indication signal associated with the determined data rate is then analyzed to determine the probability that the determined data rate is the data rate of the transmitted signal. If the quality check indication signal passes, the received frame of the digital signal is processed at the determined data rate. If not, the received frame of the digital signal is erased.

In another form, the analyzing step includes the steps of checking the plurality of quality check indication signals associated with each of the different rates, and then comparing ratios of correlation metrics of only certain of the plurality of different rates whose associated quality check indication signal passed the checking step with respective threshold values. The data rate of the received signal is then determined based on a novel decision process. If the data rate is unable to be determined, the frame of the received signal is erased.

It is an object of the present invention to provide a simple yet reliable method of determining the data rate of a received digital signal.

Other aspects, objects and advantages of the present invention can be obtained from a study of the application, the drawings, and the appended claims.

DETAILED DESCRIPTION OF THE INVENTION

Figure 1:
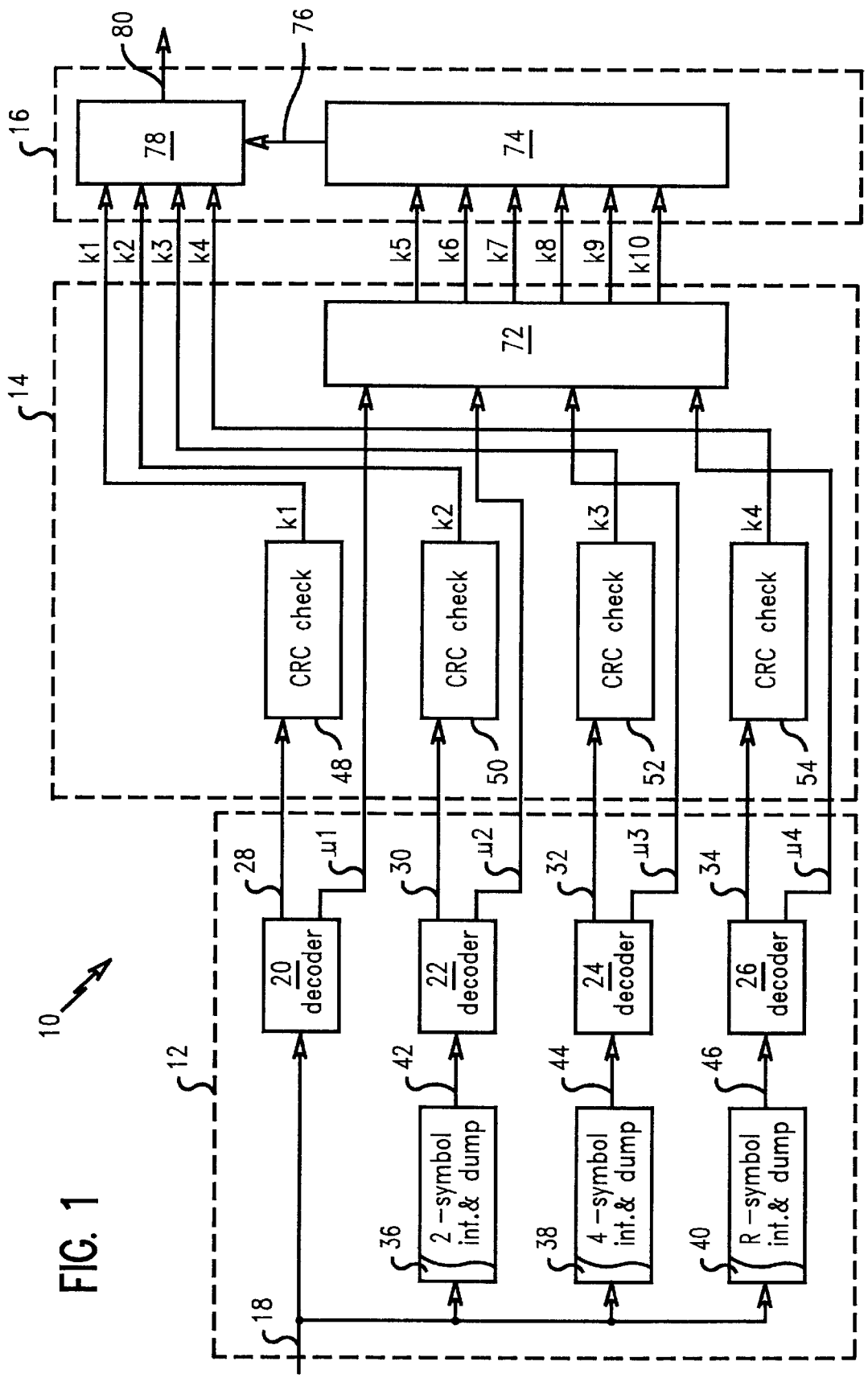
FIG. 1 is a block diagram of the rate determining apparatus according to the present invention.

FIG. 1 is a block diagram of a rate determining apparatus, shown generally at 10, according to the present invention.

When utilized in a wireless communication system, such as a cellular system conforming to, for example, IS-95 or IS-2000 standards, the rate determining apparatus 10 may be incorporated as part of a receiver at either a base station (not shown) or a mobile station (not shown). As previously noted, encoded voice data is formatted at the transmitter (not shown) into data frames of various data rates. All data frames are twenty milli-seconds in duration. Various rate sets and data rates may be employed. For example, as discussed herein, rate set 1 consists of four different frame rates, namely, 9600 bps, 4800 bps, 2400 bps, and 1200 bps. Rate set 2 similarly consists of four different frame rates, namely, 14400 bps, 7200 bps, 3600 bps, and 1800 bps. The data rates discussed herein are for exemplary purposes only, and other data rates may be utilized without departing from the spirit and scope of the present invention. Further, while the rate sets discussed herein each include four different data rates, the teachings of the present invention may be applied to rate sets having a greater or lesser number of data rates.

Generally, except for the two lowest frame rates of rate set 1 (2400 bps and 1200 bps), CRC bits are added to the vocoder produced data frames. The data frames are typically convolutionally encoded by an encoder (not shown) producing frames of symbol data. Downlink transmissions (base station to mobile station) typically utilize a convolutional encoding rate of ½, while uplink transmissions (mobile station to base station) typically utilize a convolutional encoding rate of ⅓. One skilled in the art will appreciate that the rate determining apparatus 10 of the present invention may be applied to both uplink and downlink transmissions. An interleaver (not shown) typically interleaves each frame of symbol data for error correction purposes.

For those data rates less than the full-rate data rate, e.g., 9600 or 14400 bps, the symbol data in each frame is repeated, at the transmitter (not shown), to maintain a constant symbol rate for each frame. The number of repeats is dependent upon the data rate. For example, in a frame corresponding to a half-rate data rate (4800 or 7200 bps), the symbols are repeated twice in each interleaved data frame. In a frame corresponding to a quarter-rate data rate (2400 or 3600 bps), the symbols are repeated four times in each interleaved data frame. Similarly, in a frame corresponding to an eighth-rate data rate (1200 or 1800 bps), the symbols are repeated eight times in each interleaved data frame.

The transmitter (not shown) conventionally transmits the frames of symbol data in bursts of symbol data. Regardless of the rate at which transmission occurs, the received frame is assumed to be a full-rate frame (9600 bps or 14400 bps). While the data rate may vary between the frames of a received data signal, this variation will only occur within a particular rate set.

The rate determining apparatus 10 of the present invention generally includes three blocks, namely, a decoder block 12, an information processing block 14, and a decision making block 16. After conventional processing at the receiver (not shown), i.e., demodulating and deinterleaving the received symbol data, the processed data symbols 18 are received at the decoder block 12. The decoder block 12 decodes the received symbol data at the various rates within a particular rate set, and also produces correlation metric signals as a well known indicator of data quality. The information processing block 14 receives the decoded bit sequences and correlation metrics from the decoder block 12, performs various processing steps on them, and outputs a plurality of check bits to the decision making block 16. The decision making block 16 analyzes these check bits and determines the data rate of the respective received frame.

The decoder block 12 includes decoders 20, 22, 24 and 26 corresponding to the full-rate (9600 and 14400 bps), half-rate (4800 and 7200 bps), quarter-rate (2400 and 3600 bps) and eighth-rate (1200 and 1800 bps) data rates, respectively. As previously noted, during call set up, one rate set is selected according to system preference. Upon detection of the selected rate set at the receiver (not shown), the decoder blocks 20, 22, 24 and 26 are conventionally programmed to decode the data symbols 18 in accordance with the selected rate set, e.g., rate set 1 or rate set 2.

Each of the decoders 20, 22, 24 and 26 decodes the data symbols 18 at their respective data rate, thus producing respective decoded bit sequences 28, 30, 32 and 34 at the corresponding data rate. The decoders 20,22,24 and 26 also produce correlation metrics $\mu 1$, $\mu 2$, $\mu 3$ and $\mu 4$, respectively, in addition to the respective decoded bit sequence 28, 30, 32 and 34. The correlation metrics $\mu 1$, $\mu 2$, $\mu 3$ and $\mu 4$ are the largest numbers resulting from correlating the received data with all possible transmitted sequences of the respective rates and may be determined in accordance with the teachings of U.S. Ser. No. 09/152,063 filed Sep. 11, 1998, which is hereby incorporated by reference herein.

As previously noted, at the transmission end, the symbol data is repeated for the lower frame rates (other than full-rate) to achieve a constant number of symbols in a frame. Accordingly, the decoder block 12 includes integrate and dump circuits 36, 38 and 40 for the half-rate 22, quarter-rate 24, and eighth-rate 26 decoders, respectively. The integrate and dump circuits 36, 38 and 40 sum consecutive symbols of the processed data symbols 18 and provide a sum to the respective decoder. Since transmission is assumed to occur at fall-rate, the integrate and dump circuits 36, 38 and 40 are necessary in order to essentially reduce the received signal to a data rate corresponding to that of the respective decoder. For example, the integrate and dump circuit 36 sums two consecutive symbols of the received data symbols 18 and provides a sum 42 corresponding to half-rate data to the half-rate decoder 22. Similarly, the integrate and dump circuit 38 sums four consecutive symbols of the received data symbols 18 and provides a sum 44 corresponding to quarter-rate data to the quarter-rate decoder 24. Further, the integrate and dump circuit 40 sums eight consecutive symbols of the received data symbols 18 and provides a sum 46 corresponding to eighth-rate data to the eighth-rate decoder 26.

CRC check circuits 48, 50, 52 and 54, provided in the information processing block 14, check the CRC bits in each frame of the decoded bit sequences 28, 30, 32 and 34, respectively. The CRC check circuits 48, 50, 52 and 54 provide quality check indication signals (CRC results) k1, k2, k3 and k4 to the decision making block 16. In the exemplary embodiment disclosed herein, the CRC results k1, k2, k3 and k4 are each typically represented by a one bit binary value ("0" or "1"). A "0" indicates that the CRC bits of the respective frame of the decoded bit sequence checked indicating a high probability that the data rate of the received data frame is the data rate at which the particular decoded bit sequence was decoded. A "1" indicates that the CRC bits of the respective frame of the decoded bit sequence did not check out indicating a low probability that the data rate of the received data frame is the data rate at which the decoded bit sequence was decoded. For example, k1=0 indicates a high probability that the received data frame was transmitted at the fall-rate (9600 or 14400 bps).

Figure 2:
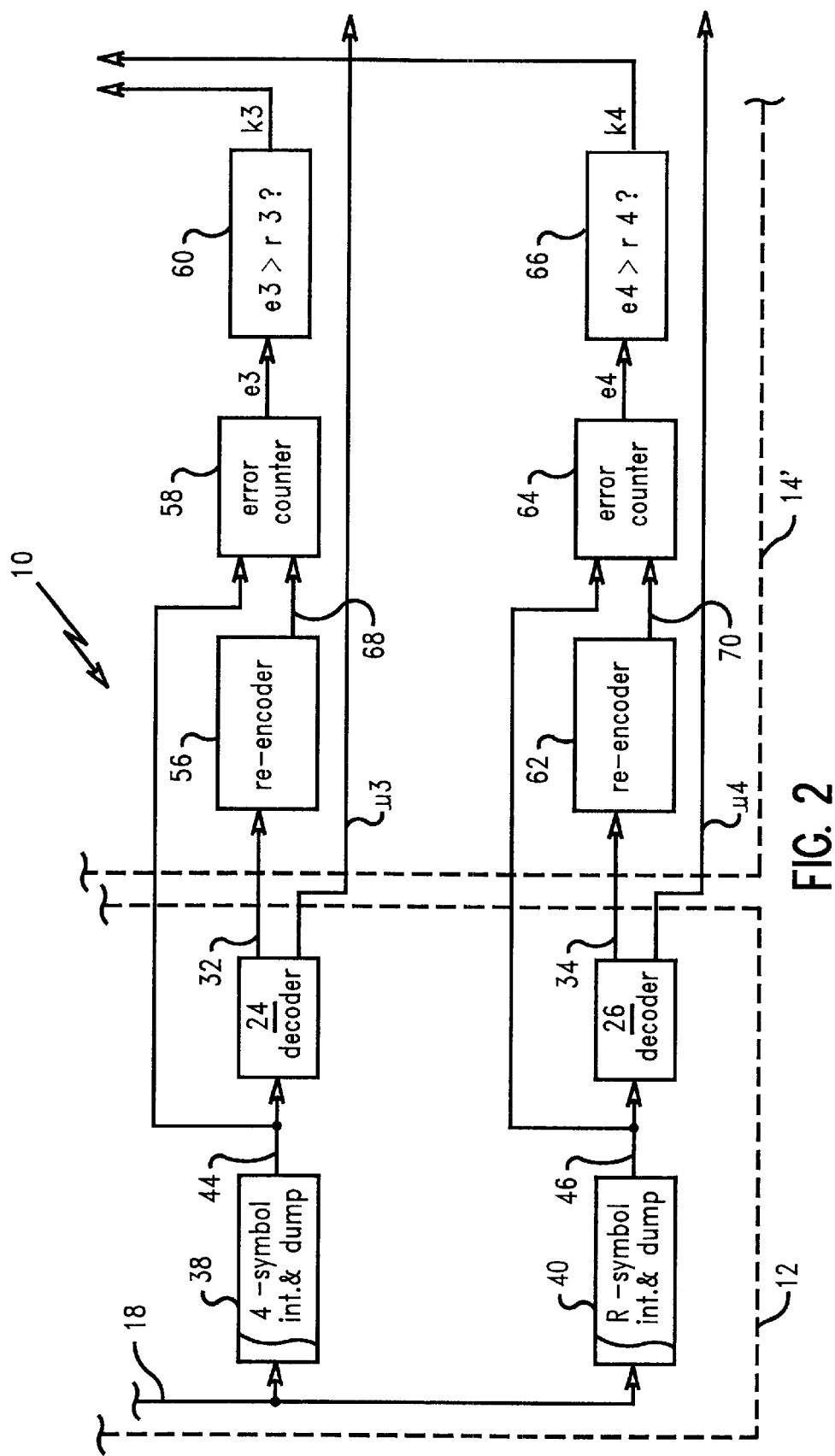
FIG. 2 is a block diagram of an alternative configuration for generating quality indication signals for the two lowest data rates.

It should be noted that the two lowest data rates of rate set 1 (2400 and 1200 bps) generally do not include CRC bits. Accordingly, as shown in FIG. 2, when rate set 1 is being utilized for data transmission, the information processing block 14' must be modified to simulate the CRC results k3 and k4. As shown in FIG. 2, the CRC check circuit 52 of FIG. 1 has been replaced with a re-encoder 56, an error counter 58 and a compare circuit 60. Similarly, the CRC check circuit 54 of FIG. 1 has been replaced with a re-encoder 62, an error counter 64, and a compare circuit 66. The decoded bit sequence 32 from the quarter-rate decoder 24 is re-encoded by the re-encoder 56 producing quarter-rate re-encoded data symbols 68. The error counter 58 compares the re-encoded data symbols 68 with the undecoded summed data symbols 44 and produces a symbol error signal e3 representing the number of symbols that do not match in a frame. The symbol error signal e3 is compared with a threshold value r3 by the compare circuit 60. If the number of errors represented by the symbol error signal e3 is greater than the threshold value r3, the compare circuit 60 outputs k3="1", indicating a low probability that the data rate of the received data frame is the data rate at which the decoded bit sequence 32 was decoded. If the number of errors represented by the symbol error signal e3 is less than the threshold value r3, the compare circuit 60 outputs k3="0", indicating a high probability that the data rate of the received data frame is the data rate at which the decoded bit sequence 32 was decoded.

Similarly, the decoded bit sequence 34 from the eighth-rate de coder 26 is re-encoded by the re-encoder 62 producing eighth-rate re-encoded data symbols 70. The error counter 64 compares the re-encoded data symbols 70 with the undecoded summed data symbols 46 and produces a symbol error signal e4 representing the number of symbols that do not match in a frame. The symbol error signal e4 is compared with a threshold value r4 by the compare circuit 66. If the number of errors represented by the symbol error signal e4 is greater than the threshold value r4, the compare circuit 66 outputs k4="1" (low probability that data rate correct), otherwise the compare circuit 66 outputs k4="0" (high probability that data rate correct). In a preferred form, the selected threshold values are r3=14 and r4=8. In this manner, simulated CRC results k3 and k4 are produced.

Referring back to FIG. 1, the correlation metrics $\mu 1$, $\mu 2$, $\mu 3$ and $\mu 4$ are received at a metric comparison circuit 72, which compares various ratios between the correlation metrics $\mu 1$, $\mu 2$, $\mu 3$ and $\mu 4$ with various threshold values. There are a total of six pairwise comparisons among the four possible rates (correlation metrics), which are accordingly compared with six threshold values. As a result of comparing the six metric ratios with the six threshold values, six check bits k5, k6, k7, k8, k9 and k10 are generated by the metric comparison circuit 72. The check bits k5, k6, k7, k8, k9 and k10 are generated according to the following ratio comparisons.

$$k5 = \begin{cases} 1, & \text{for } \mu 1/\mu 2 > \lambda_{1,2} \\ 0, & \text{otherwise} \end{cases}, \quad k6 = \begin{cases} 1, & \text{for } \mu 1/\mu 3 > \lambda_{1,3} \\ 0, & \text{otherwise} \end{cases},$$

$$k7 = \begin{cases} 1, & \text{for } \mu 1/\mu 4 > \lambda_{1,4} \\ 0, & \text{otherwise} \end{cases}, \quad k8 = \begin{cases} 1, & \text{for } \mu 2/\mu 3 > \lambda_{2,3} \\ 0, & \text{otherwise} \end{cases},$$

$$k9 = \begin{cases} 1, & \text{for } \mu 2/\mu 4 > \lambda_{2,4} \\ 0, & \text{otherwise} \end{cases}, \quad k10 = \begin{cases} 1, & \text{for } \mu 3/\mu 4 > \lambda_{3,4} \\ 0, & \text{otherwise} \end{cases}.$$

The preferred optimal threshold between the $i^{th}$ and $j^{th}$ rates, denoted by $\lambda_{ij}$ for $i=1, \ldots, 3$ and $j=i+1, \ldots, 4$ are provided below in Table 1 for both rate sets.

TABLE 1

Rate Detection Thresholds

| | $\lambda_{1,2}$ | $\lambda_{1,3}$ | $\lambda_{1,4}$ | $\lambda_{2,3}$ | $\lambda_{2,4}$ | $\lambda_{3,4}$ |
|---|---|---|---|---|---|---|
| Rate Set 1 | 1.2589 | 1.7398 | 2.4534 | 1.3349 | 1.8631 | 1.3402 |
| Rate Set 2 | 1.1779 | 1.5424 | 2.3007 | 1.2891 | 1.8504 | 1.3554 |

The check bits k5, . . . , k10 are received by a rate determination block 74 provided in the decision making block 16, which analyzes the check bits k5, . . . , k10 to determine the data rate of the received data signal. The rate determination block 74 outputs a signal 76 indicative of the determined rate. The rate determination block 74 uses the following criteria in determining the data rate from the check bits k5, . . . , k10.

| Full-rate | if | k5 = 1 | and | k6 = 1 | and | k7 = 1 |
| Half-rate | if | k5 = 0 | and | k8 = 1 | and | k9 = 1 |
| Quarter-rate | if | k6 = 0 | and | k8 = 0 | and | k10 = 1 |
| Eighth-rate | if | k7 = 0 | and | k9 = 0 | and | k10 = 0 |

While the rates may be checked in any manner, in the exemplary embodiment, it is preferred that the highest frame rate (full-rate) be checked first, the next highest rate (half-rate) be checked second, etc. The validation of any rate will exclude all other possibilities. If none of the data rates check out, the signal 76 generated by the rate determination block 74 indicates that the data rate is unable to be determined and that the analyzed frame should be erased.

Assuming the data rate can be determined, the rate determination block 74 generates the signal 76 indicating a particular determined data rate. The determined data rate signal 76 is received by a CRC validation circuit 78 which checks the CRC result k1, . . . , k4 corresponding to the determined data rate. If the particular CRC result k1, . . . , k4 of the determined data rate is a "0", the CRC validation circuit 78 generates a signal 80 indicating that the analyzed frame is to be assigned the determined data rate. If the particular CRC result k1, . . . , k4 of the determined data rate is a "1", the signal 80 generated by the CRC validation circuit 78 indicates that the analyzed frame should be erased.

Figure 3:
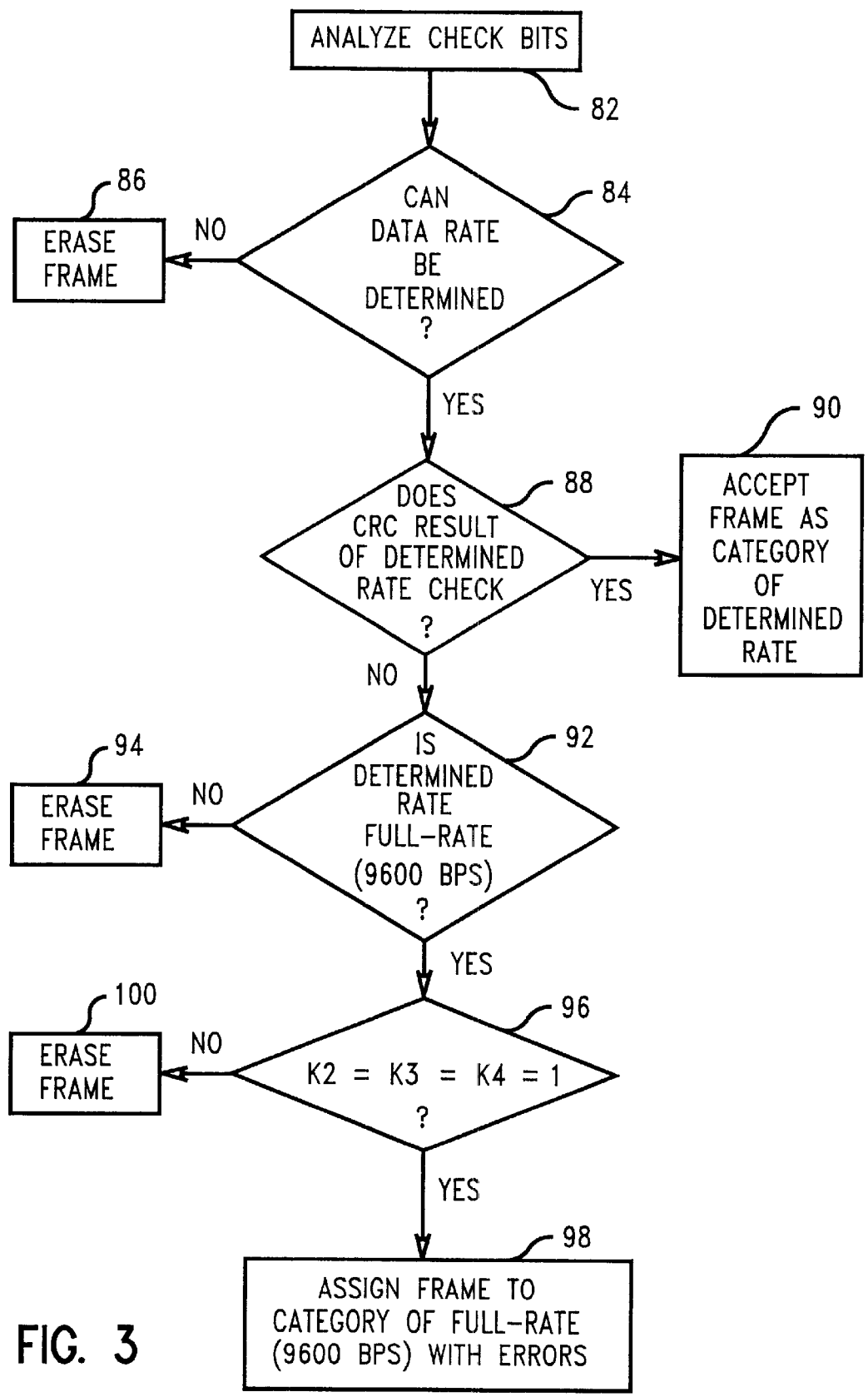
FIG. 3 is a decision flow chart of a rate determination process according to the present invention using rate set 1.

Since the two rates sets have different frame categories, the algorithms utilized by the decision making block 16 are slightly different. FIG. 3 illustrates the decision flow chart utilizing rate set 1 (9600, 4800, 2400 and 1200 bps). The rate determination block 74 analyzes the check bits k5, . . . , k10, at block 82, and determines whether or not the data rate of the frame can be determined, at block 84. If the data rate cannot be determined at block 84, the frame is erased, at block 86. If the data rate can be determined at block 84, the CRC validation circuit 78 checks the CRC result k1, . . . , k4 of the determined rate, at block 88. If the CRC result checks out at block 88 (kn=0), the frame is accepted as the category of the determined rate (9600, 4800, 2400 or 1200 bps), at block 90. If the CRC result of the determined rate does not check out at block 88 (kn=1), the CRC validation circuit 78 decides whether or not the determined rate is the full-rate (9600 bps), at block 92. If the determined rate is not the full-rate (9600 bps) at block 92, the frame is erased, at block 94. If the determined rate is the full-rate (9600 bps) at block 92, the CRC validation circuit 78 then determines if the CRC results k2, k3 and k4 for the other rates are all "1", at block 96. If yes, the frame is assigned to the category of full-rate (9600 bps) with errors, at block 98. If not, the frame is erased, at block 100.

Figure 4:
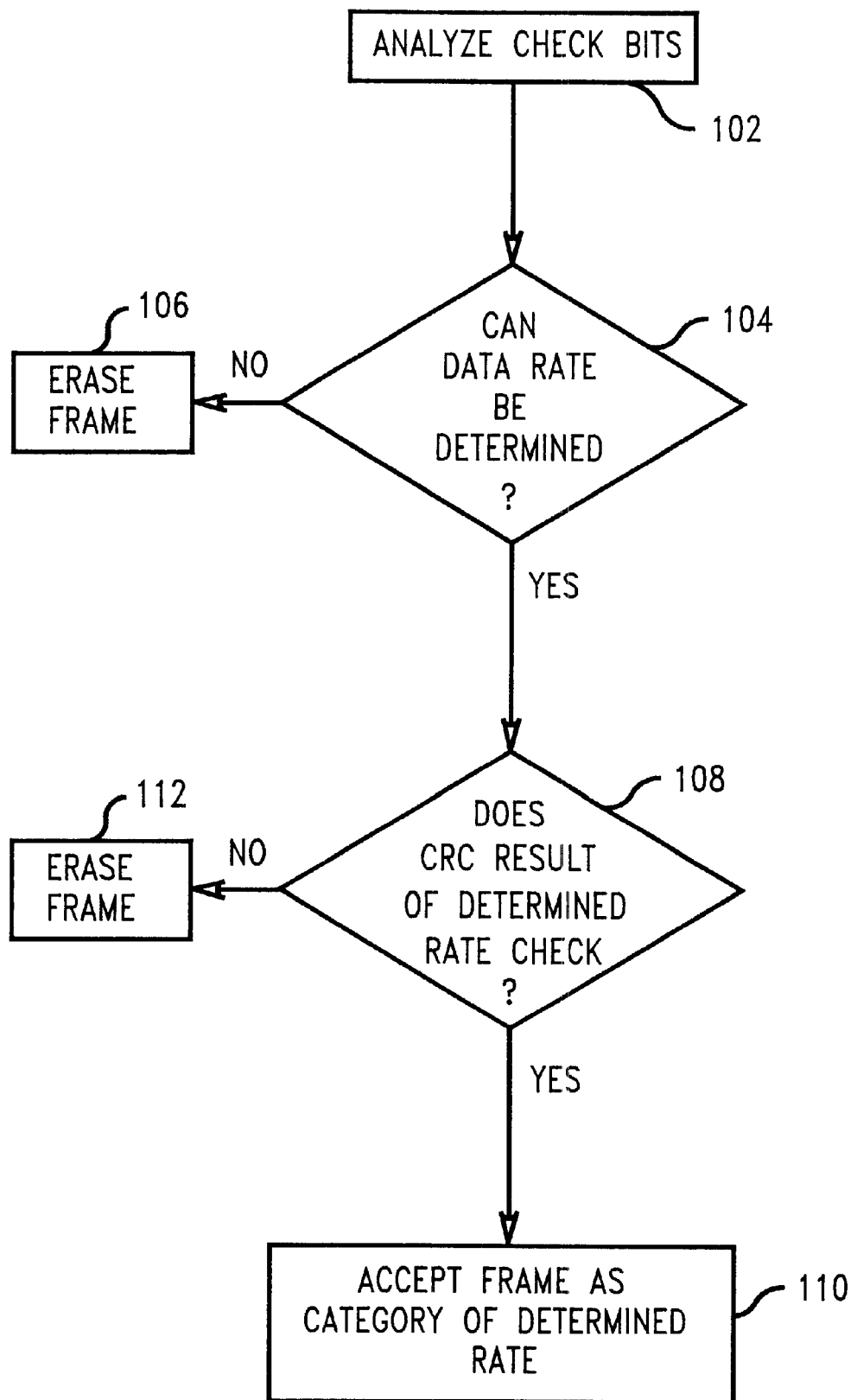
FIG. 4 is a decision flow chart of a rate determination process according to the present invention using rate set 2.

FIG. 4 illustrates the decision flow chart utilizing rate set 2 (14400, 7200, 3600 and 1800 bps). The rate determination block 74 analyzes the check bits k5, . . . , k10 at block 102, and determines whether or not the data rate of the frame can be determined, at block 104. If the data rate cannot be determined at block 104, the frame is erased, at block 106. If the data rate can be determined at block 104, the CRC validation circuit 78 checks the CRC result k1, . . . , k4 of the determined rate, at block 108. If the CRC result of the determined rate checks out at block 108 (kn=0), the frame is accepted as the category of the determined rate (14400, 7200, 3600 or 1800 bps) at block 110. If the CRC result of the determined rate does not check out (kn=1) at block 108, the frame is erased, at block 112.

Figure 5:
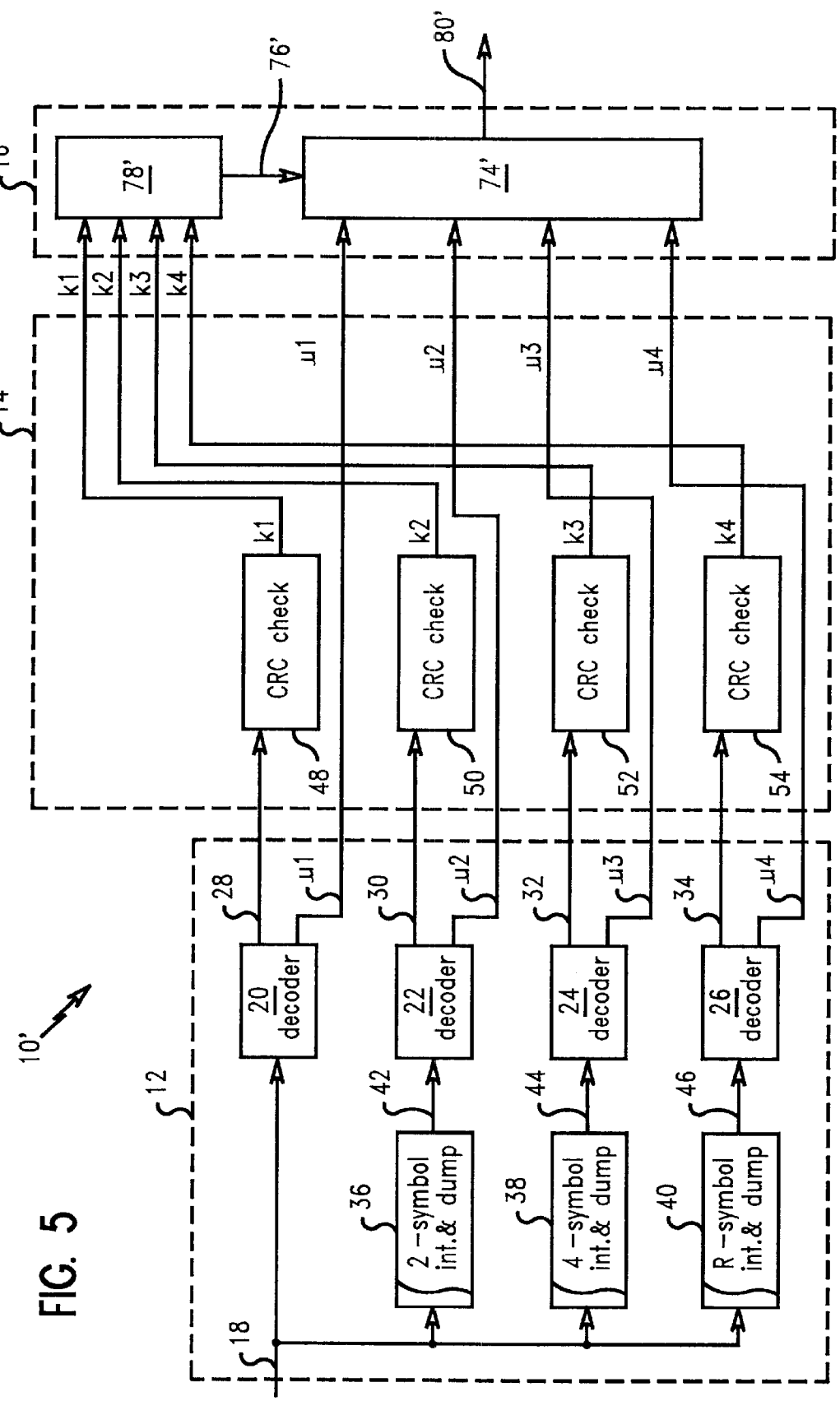
FIG. 5 is a block diagram of an alternate embodiment of the rate determining apparatus according to the present invention.

FIG. 5 illustrates an alternative embodiment of the present invention, shown generally at 10', with like elements of FIG. 1 indicated by the same reference numbers and those elements requiring modification indicated with a prime ('). The quality indication signals (CRC results) k1, . . . , k4 and the correlation metrics $\mu 1, \ldots, \mu 4$ are developed by the decoder block 12 in the same manner as previously described with respect to FIG. 1. However, in the embodiment shown in FIG. 5, the correlation metrics are supplied directly to the rate determination block 74' decision making block 16'. The CRC validation circuit 78' in the rate determination block 16' receives the CRC results k1, . . . , k4 from the information processing block 14'. The CRC validation circuit 78' checks the CRC results k1, . . . , k4 to see if any of them are "0" (high probability that data rate correct). The CRC validation circuit 78' generates an indication signal 76' indicating which of the CRC results k1, . . . , k4 checked out. The indication signal 76' is received by the rate determination block 74' which compares correlation metric ratios of only those data rates whose corresponding CRC result has checked out (kn=0) and develops a signal 80' indicating either that the analyzed frame is to be assigned a corresponding data rate or that the frame should be erased. Depending upon the number of CRC results which check out, and the rate set being utilized, one of three tests may be performed. These will be referred to as the λ Test. the γ Test, and the η Test.

λ Test

If more than one CRC result checks out, the pairwise comparison is performed among the data rates with the checked CRC results. Provided below are the various CRC check results possible and the metric ratios which are correspondingly compared. For convenience, the various data rates will be indicated as 1, 2, 3 or 4 corresponding to full-rate (k1, $\mu 1$), half-rate (k2, $\mu 2$), quarter-rate (k3, $\mu 3$), and eighth-rate (k4, $\mu 4$) data rates, respectively.

Comparison if Rates 1 and 2 Check Out

If $\mu 1/\mu 2 > \lambda_{1,2}$, rate 1 is selected. If $\mu 1/\mu 2 < \lambda_{1,2}$, rate 2 is selected. Otherwise, the frame is erased.

Comparison if Rates 1 and 3 Check Out

If $\mu 1/\mu 3 > \lambda_{1,3}$, rate 1 is selected. If $\mu 1/\mu 3 < \lambda_{1,3}$, rate 3 is selected. Otherwise, the frame is erased.

Comparison if Rates 1 and 4 Check Out

If $\mu 1/\mu 4 > \lambda_{1,4}$, rate 1 is selected. If $\mu 1/\mu 4 < \lambda_{1,4}$, rate 4 is selected. Otherwise, the frame is erased.

Comparison if Rates 2 and 3 Check Out

If $\mu 2/\mu 3 > \lambda_{2,3}$, rate 2 is selected. If $\mu 2/\mu 3 < \lambda_{2,3}$, rate 3 is selected. Otherwise, the frame is erased.

Comparison if Rates 2 and 4 Check Out

If $\mu 2/\mu 4 > \lambda_{2,4}$, rate 2 is selected. If $\mu 2/\mu 4 < \lambda_{2,4}$, rate 4 is selected. Otherwise, the frame is erased.

Comparison if Rates 3 and 4 Check Out

If $\mu 3/\mu 4 > \lambda_{3,4}$, rate 3 is selected. If $\mu 3/\mu 4 < \lambda_{3,4}$, rate 4 is selected. Otherwise, the frame is erased.

Comparison if Rates 1, 2 and 3 Check Out

If $\mu 1/\mu 2 > \lambda_{1,2}$ and $\mu 1/\mu 3 > \lambda_{1,3}$, rate 1 is selected. If $\mu 1/\mu 2 < \lambda_{1,2}$ and $\mu 2/\mu 3 > \lambda_{2,3}$ rate 2 is selected. If $\mu 1/\mu 3 < \lambda_{1,3}$ and $\mu 2/\mu 3 < \lambda_{2,3}$ rate 3 is selected. Otherwise, the frame is erased.

Comparison if Rates 1, 2 and 4 Check Out

If $\mu 1/\mu 2 > \lambda_{1,2}$ and $\mu 1/\mu 4 > \lambda_{1,4}$ rate 1 is selected. If $\mu 1/\mu 2 < \lambda_{1,2}$ and $\mu 2/\mu 4 > \lambda_{2,4}$ rate 2 is selected. If $\mu 1/\mu 4 < \lambda_{1,4}$ and $\mu 2/\mu 4 < \lambda_{2,4}$ rate 4 is selected. Otherwise, the frame is erased.

Comparison if Rates 1, 3 and 4 Check Out

If $\mu 1/\mu 3 > \lambda_{1,3}$ and $\mu 1/\mu 4 > \lambda_{1,4}$ rate 1 is selected. If $\mu 1/\mu 3 < \lambda_{1,3}$ and $\mu 3/\mu 4 > \lambda_{3,4}$ rate 3 is selected. If $\mu 1/\mu 4 < \lambda_{1,4}$ and $\mu 3/\mu 4 < \lambda_{3,4}$ rate 4 is selected. Otherwise, the frame is erased.

Comparison if Rates 2, 3 and 4 Check Out

If $\mu 2/\mu 3 > \lambda_{2,3}$ and $\mu 2/\mu 4 > \lambda_{2,4}$, rate 2 is selected. If $\mu 2/\mu 3 < \lambda_{2,3}$ and $\mu 3/\mu 4 > \lambda_{3,4}$, rate 3 is selected. If $\mu 2/\mu 4 < \lambda_{2,4}$ and $\mu 3/\mu 4 < \lambda_{3,4}$, rate 4 is selected. Otherwise, the frame is erased.

Comparison if Rates 1, 2, 3 and 4 Check Out

If $\mu 1/\mu 2 > \lambda_{1,2}$ and $\mu 1/\mu 3 > \lambda_{1,3}$ and $\mu 1/\mu 4 > \lambda_{1,4}$, rate 1 is selected. If $\mu 1/\mu 2 < \lambda_{1,2}$ and $\mu 2/\mu 3 > \lambda_{2,3}$ and $\mu 2/\mu 4 > \lambda_{2,4}$ rate 2 is selected. If $\mu 1/\mu 3 < \lambda_{1,3}$ and $\mu 2/\mu 3 < \lambda_{2,3}$ and $\mu 3/\mu 4 > \lambda_{3,4}$, rate 3 is selected. If $\mu 1/\mu 4 < \lambda_{1,4}$ and $\mu 2/\mu 4 < \lambda_{2,4}$ and $\mu 3/\mu 4 < \lambda_{3,4}$, rate 4 is selected. Otherwise, the frame is erased The threshold values ($\lambda_{ij}$) for the various conditions noted above for rate sets 1 and 2 are provided below in Table 2.

TABLE 2

| | Rate Detection Thresholds for A Test | | | | | |
|---|---|---|---|---|---|---|
| | $\lambda_{1,2}$ | $\lambda_{1,3}$ | $\lambda_{1,4}$ | $\lambda_{2,3}$ | $\lambda_{2,4}$ | $\lambda_{3,4}$ |
| Rate Set 1 | 1.2454 | 1.4090 | 1.8061 | 1.2433 | 1.7145 | 1.2337 |
| Rate Set 2 | 1.1697 | 1.4768 | 2.0038 | 1.2508 | 1.6499 | 1.3704 |

γ Test

If only one CRC result checks out at the CRC validation circuit 78', a decision has to be made by the rate determination block 74' regarding whether to erase or accept the frame. It cannot be accepted without further checking the corresponding correlation metric $\mu 1, \ldots, \mu 4$ for the reliability of the CRC check result. Therefore, a new set of threshold values are needed for this condition. For example, if the CRC result of rate 1 is the only one that checked out, the metric ratios $\mu 1/\mu 2$, $\mu 1/\mu 3$, and $\mu 1/\mu 4$ are compared. If $\mu 1/\mu 2 > \gamma_{1,2}$ and $\mu 1/\mu 3 > \gamma_{1,3}$ and $\mu 1/\mu 4 > \gamma_{1,4}$, the frame is accepted and the rate is determined to be rate 1. Otherwise, the frame is erased.

If the CRC result of rate 2 is the only one that checked out, the metric ratios $\mu 2/\mu 1$, $\mu 2/\mu 3$, and $\mu 2/\mu 4$ are compared. If $\mu 2/\mu 1 > \gamma_{2,1}$ and $\mu 2/\mu 3 > \gamma_{2,3}$ and $\mu 2/\mu 4 > \gamma_{2,4}$, the frame is accepted and the rate is determined to be rate 2. Otherwise, the frame is erased.

If the CRC result of rate 3 is the only one that checked out, the metric ratios $\mu 3/\mu 1$, $\mu 3/\mu 2$, and $\mu 3/\mu 4$ are compared. If $\mu 3/\mu 1 > \gamma_{3,1}$ and $\mu 3/\mu 2 > \gamma_{3,2}$ and $\mu 3/\mu 4 > \gamma_{3,4}$, the frame is accepted and the rate is determined to be rate 3. Otherwise, the frame is erased.

If the CRC result of rate 4 is the only one that checked out, the metric ratios $\mu 4/\mu 1$, $\mu 4/\mu 2$, and $\mu 4/\mu 3$ are compared. If $\mu 4/\mu 1 > \gamma_{4,1}$ and $\mu 4/\mu 2 > \gamma_{4,2}$ and $\mu 4/\mu 3 > \gamma_{4,3}$, the frame is accepted and the rate is determined to be rate 4. Otherwise, the frame is erased.

The thresholds for the various conditions noted above for rate sets 1 and 2 are provided below in Table 3.

TABLE 3

Rate Detection Thresholds for γ Test

|  | $\gamma_{1,2}$ | $\gamma_{1,3}$ | $\gamma_{1,4}$ | $\gamma_{2,1}$ | $\gamma_{2,3}$ | $\gamma_{2,4}$ |
| --- | --- | --- | --- | --- | --- | --- |
| Rate Set 1 | 1.1267 | 1.4838 | 2.1029 | 0.8204 | 1.3449 | 1.9065 |
| Rate Set 2 | 1.0544 | 1.3591 | 1.8998 | 0.8380 | 1.2837 | 1.7281 |
|  | $\gamma_{3,1}$ | $\gamma_{3,2}$ | $\gamma_{3,4}$ | $\gamma_{4,1}$ | $\gamma_{4,2}$ | $\gamma_{4,3}$ |
| Rate Set 1 | 0.6164 | 0.8144 | 1.4206 | 0.3860 | 0.5147 | 0.7280 |
| Rate Set 2 | 0.6139 | 0.7673 | 1.2893 | 0.4080 | 0.5060 | 0.6801 |

η Test

If none of the CRC results check out at the CRC validation circuit 78', the frame is erased for rate set 2. If rate set 1 is being utilized, the frame must be checked for the category of 9600 bps with errors. Test results have shown that the probability of false assignment in this category may be very high for some test cases, therefore, a set of three additional thresholds is required to reduce the probability of false detection. These thresholds are listed below in Table 4.

TABLE 4

Rate Detection Thresholds for η Test

|  | $\eta_{1,2}$ | $\eta_{1,3}$ | $\eta_{1,4}$ |
| --- | --- | --- | --- |
| Rate Set 1 | 1.3692 | 1.9768 | 3.3775 |

Accordingly, if none of the CRC results check out, the metric ratios $\mu 1/\mu 2$, $\mu 1/\mu 3$ and $\mu 1/\mu 4$ are compared with the thresholds provided above. If $\mu 1/\mu 2 > \eta_{1,2}$ and $\mu 1/\mu 3 > \eta_{1,3}$ and $\mu 1/\mu 4 > \eta_{1,4}$, the frame is assigned to the category of 9600 bps with errors. Otherwise, the frame is erased.

Figure 6:
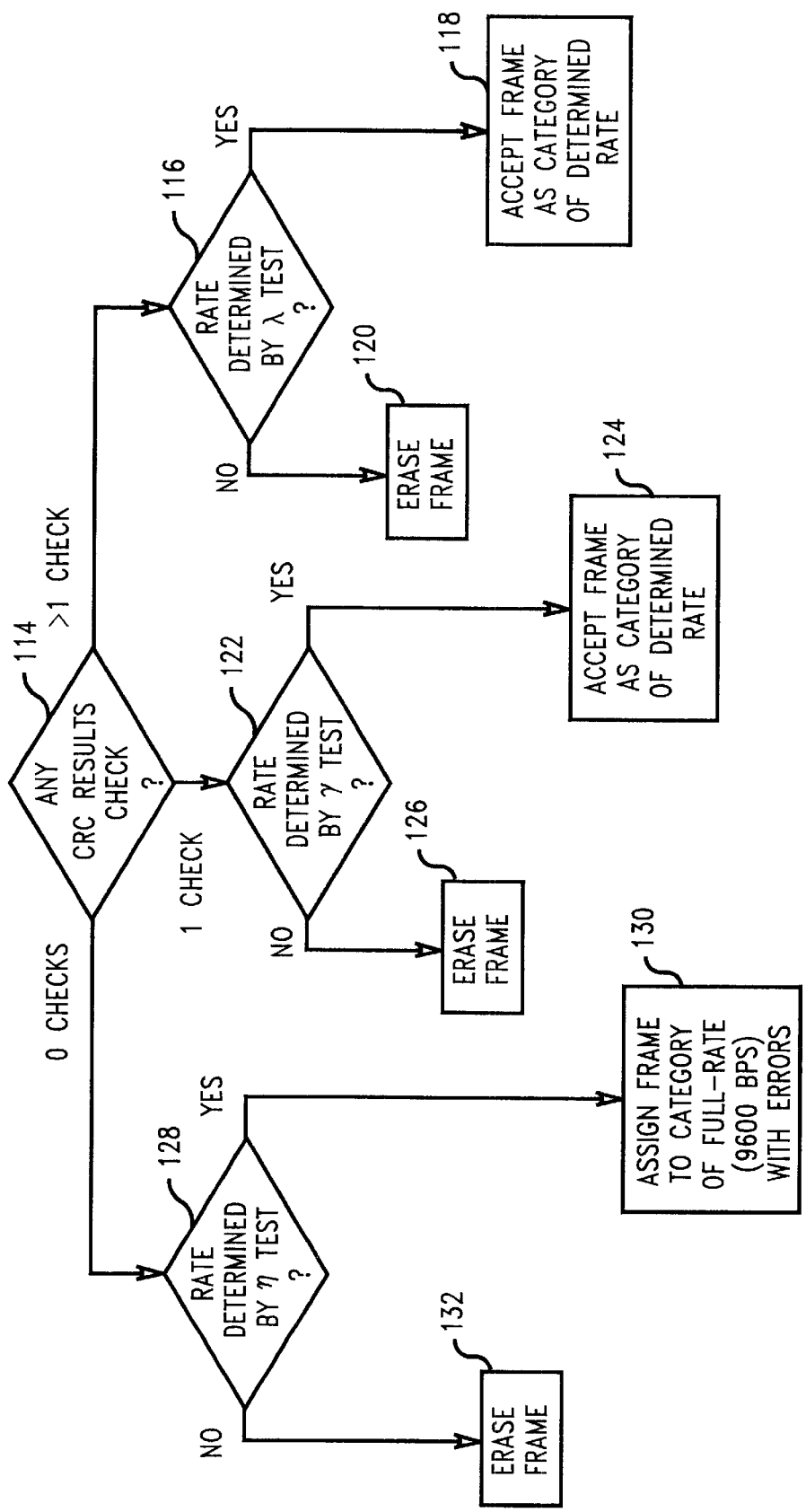
FIG. 6 is a decision flow chart of a rate determination process utilized in conjunction with the alternate embodiment of the rate determining apparatus using rate set 1.

Since the two rate sets have different frame categories, the algorithms utilized by the decision making block 16' are slightly different. FIG. 6 illustrates the decision flow chart using rate set 1 (9600, 4800, 2400 and 1200 bps). The CRC validation circuit 78' determines which, if any, of the CRC results k1, . . . , k4 check out, at block 114. If more than one CRC result checks out at block 114, the rate determination block 74' determines if the data rate of the frame can be determined using the λ Test, at block 116. If the data rate can be determined at block 116, the frame is accepted as the category of the determined rate, at block 118. If not, the frame is erased, at block 120.

If only one CRC results checks out at block 114, the rate determination block 74' determines if the data rate of the frame can be determined using the γ Test at block 122. If the data rate can be determined at block 122, the frame is accepted as the category of the determined rate, at block 124. If not, the frame is erased, at block 126.

If no CRC results check out at block 114, the rate determination block 74' determines if the data rate of the frame should be assigned to the category of full-rate (9600 bps) with errors using the η Test at block 128. If it is determined that the conditions of the η Test have been met at block 128, the frame is assigned the category of full-rate (9600 bps) with errors, at block 130. Otherwise, the frame is erased, at block 132.

Figure 7:
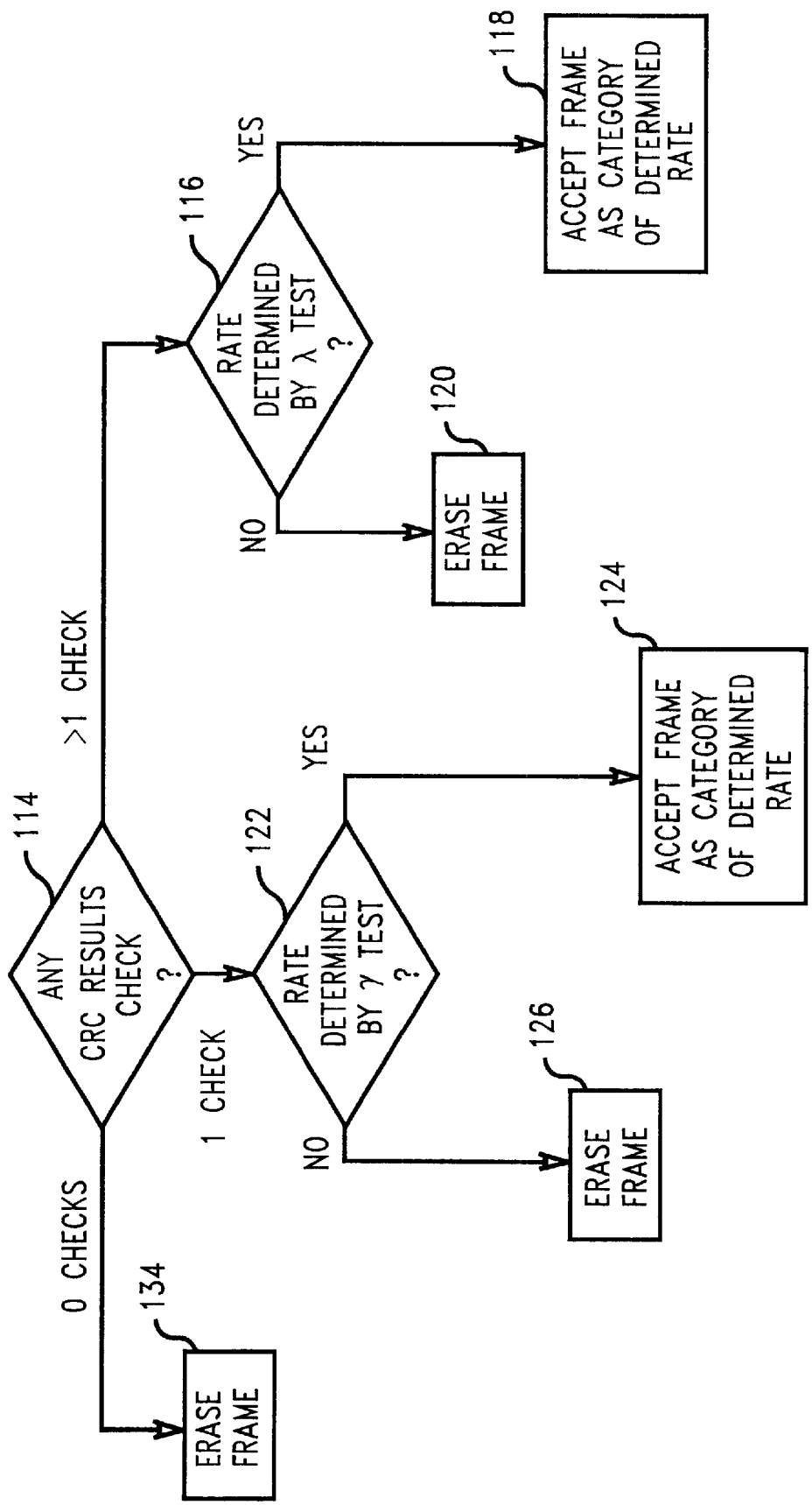
FIG. 7 is a decision flow chart of a rate determination process utilized in conjunction with the alternate embodiment of the rate determining apparatus using rate set 2.

FIG. 7 illustrates the decision flow chart utilizing rate set 2 (14400, 7200, 3600 and 1800 bps), with like steps of FIG. 6 indicated with the same reference numbers. The steps indicated by blocks 114, 116, 118, 120, 122, 124 and 126 are performed in the same manner as previously described with respect to FIG. 6, albeit with different threshold values. The only difference is that if no CRC results check out at block 114, the frame is simply erased, at block 134. No determination is made whether to assign the frame an errored version of the full-rate data rate.

As described above, the present invention provides a simple yet effective method of determining the data rate of a received digital signal without an explicit indication from the transmitting source.

While the invention has been described with particular reference to the drawings, it should be understood that various modifications could be made without departing from the spirit and scope of the present invention.

What is claimed is:

1. A method of detecting a data rate of a received signal comprising the steps of:

decoding the received signal at a plurality of different rates producing a plurality of decoded bit sequences and a corresponding plurality of correlation metrics, one each for the plurality of different rates;

performing quality checks on the plurality of decoded bit sequences producing a plurality of quality check indication signals, one each for the plurality of different rates, the quality check indication signals indicating a probability that the data rate of the received signal is the data rate at which the particular decoded bit sequence was decoded;

comparing ratios of the plurality of correlation metrics with respective threshold values;

determining the data rate of the received signal based on said comparison;

analyzing the quality check indication signal associated with the determined data rate; and confirming the determined data rate based on said quality check indication signal.

2. The method of claim 1, wherein performing quality checks on the plurality of decoded bit sequences comprises, for only the two lowest rates of said plurality of different rates, re-encoding said decoded bit sequences at the same rate at which they were decoded, and comparing the re-encoded signal to the received signal.

3. The method of claim 1, wherein, for the two highest rates of said plurality of different rates, the corresponding decoded bit sequences are not re-encoded in determining or confirming said the data rate of the received signal.

4. The method of claim 1, wherein the confirming step comprises the steps of:

assigning the determined data rate as the data rate of the received signal if the quality check indication signal associated with the determined data rate indicates a high probability of success; and generating an error signal indicating that the data rate of the received signal cannot be determined if the quality check indication signal associated with the determined data rate indicates a low probability of success.

5. The method of claim 1, wherein the plurality of quality check indication signals each comprises a single binary bit, wherein a binary "0" indicates a high probability that the data rate of the received signal is the data rate of the corresponding decoded bit sequence associated with a particular quality check indication signal, and wherein a binary "1" indicates a low probability that the data rate of the received signal is the data rate of the corresponding decoded bit sequence associated with the particular quality check indication signal.

6. The method of claim 1, wherein the step of performing quality checks on the plurality of decoded bit sequences comprises the step of performing Cyclic Redundancy Checks on the plurality of decoded bit sequences.

7. The method of claim 1, wherein the plurality of different rates includes first through fourth different rates.

8. The method of claim 7, wherein the analyzing step comprises the steps of:

comparing ratios of the first through fourth metrics with respective threshold values; and determining the data rate of the received signal based on said comparison.

9. The method of claim 8, wherein the step of determining the data rate of the received signal based on said comparison comprises the steps of:

selecting the first data rate as the determined data rate if the ratio of the first correlation metric to the second correlation metric exceeds a first threshold value, the ratio of the first correlation metric to the third correlation metric exceeds a second threshold value, and the ratio of the first correlation metric to the fourth correlation metric exceeds a third threshold value;

selecting the second data rate as the determining data rate if the ratio of the first correlation metric to the second correlation metric is less than the first threshold value, the ratio of the second correlation metric to the third correlation metric exceeds a fourth threshold value, and the ratio of the second correlation metric to the fourth correlation metric exceeds a fifth threshold value;

selecting the third data rate as the determined data rate if the ratio of the first correlation metric to the third correlation metric is less than the second threshold value, the ratio of the second correlation metric to the third correlation metric is less than the fourth threshold value, and the ratio of the third correlation metric to the fourth correlation metric exceeds the sixth threshold value; and selecting the fourth data rate as the determined data rate if the ratio of the first correlation metric to the fourth correlation metric is less than the third threshold value, the ratio of the second correlation metric to the fourth correlation metric is less than the fifth threshold value, and the ratio of the third correlation metric to the fourth correlation metric is less than the sixth threshold value.

10. The method of claim 9, wherein the selection of any of the first through fourth data rates as the determined data rate excludes the selection of any other data rate as the determined data rate.

11. The method of claim 9, further comprising the step of generating an error signal indicating that the data rate of the received signal cannot be determined if none of the conditions for selecting between the first through fourth data rates are met.

12. The method of claim 9, wherein the analyzing step further comprises the steps of:

analyzing the quality check indication signal associated with the data rate selected as the determined data rate; and confirming the selected data rate as the determined data rate based on said quality check indication signal analyzation.

13. The method of claim 12, wherein the confirming step comprises the steps of:

assigning the selected data rate as the determined data rate if the quality check indicating signal associated with the selected data rate indicates a high probability of success; and generating an error signal indicating that the data rate cannot be determined if the quality check indication signal associated with the selected data rate indicates a low probability of success.

14. The method of claim 9, wherein the analyzing step further comprises the steps of:

analyzing the quality check indicating signal associated with the data rate selected as the determined data rate;

assigning the selected data rate as the determined data rate if the quality check indication signal associated with the selected data rate indicates a high probability of success;

if the quality check indication signal associated with the selected data rate indicates a low probability of success, determining whether the selected data rate is the first data rate;

if the selected data rate is determined to be the first data rate, determining if each of the second through fourth quality check indication signals indicate a low probability of success, otherwise generate an error signal indicating that the data rate cannot be determined;

if each of the second through fourth quality check indication signals are determined to indicate a low probability of success, assigning an errored version of the first data rate as the determined data rate, otherwise generate an error signal indicating that the data rate cannot be determined.

15. The method of claim 1, wherein the analyzing step comprises the steps of:

checking the plurality of quality check indication signals;

comparing ratios of correlation metrics from only certain of the plurality of different rates whose associated quality check indication signal passed the checking step with respective threshold values; and determining the data rate of the received signal based on said comparison.

16. The method of claim 15, wherein the plurality of different data rates include a first data rate defined as a most likely data rate of the received signal, and wherein the method further comprises the steps of:

if none of the plurality of quality check indication signals pass the checking step, comparing ratios of the first correlation metric associated with the first data rate with the correlation metrics associated with the other of the plurality of different data rates with respective threshold values; and if each of the ratios exceeds respective threshold values, assigning an errored version of the first data rate as the determined data rate, otherwise generate an error signal indicating that the data rate cannot be determined.

17. An apparatus for detecting a data rate of a received signal comprising:

means for decoding the received signal at a plurality of different rates and for producing a plurality of decoded bit sequences and a corresponding plurality of correlation metrics, one each for the plurality of different rates;

means for performing quality checks on the plurality of decoded bit sequences producing a plurality of quality check indication signals, one each for the plurality of different rates, the quality check indication signals indicating a probability that the data rate of the received signal is the data rate at which the particular decoded bit sequence was decoded;

a metric comparison circuit receiving the plurality of correlation metrics, comparing various ratios between the plurality correlation metrics with various threshold values, and developing check bits indicative of whether a particular ratio exceeded a particular threshold value;

a rate determination block receiving the check bits and developing a first signal indicative of a determined data rate of the received signal; and a validation circuit receiving the quality check indication signals and the first signal and developing a second signal, based on an analysis of the quality check indication signals and the first signal, assigning the received signal a data rate.

18. The apparatus of claim 17, wherein the decoding means comprises a plurality of decoders each decoding the received signal at a different rate to produce the plurality of decoded bit sequences and the corresponding plurality of correlation metrics.

19. The apparatus of claim 17, wherein the quality check performing means comprises a plurality of CRC check circuits receiving the plurality of decoded bit sequences and developing the plurality of quality check indication signals based on an analysis of CRC bits associated with each of the plurality of decoded bit sequences, wherein the plurality of quality check indication signals each comprise a single binary bit, wherein a binary "0" indicates a high probability that the data rate of the received signal is the data rate of the corresponding decoded bit sequence associated with a particular quality check indication signal, and wherein a binary "1" indicates a low probability that the data rate of the received signal is the data rate of the corresponding decoded bit sequence associated with the particular quality check indication signal.

20. An apparatus for detecting a data rate of a received signal comprising:

means for decoding the received signal at a plurality of different rates and for producing a plurality of decoded bit sequences and a corresponding plurality of correlation metrics, one each for the plurality of different rates;

means for performing quality checks on the plurality of decoded bit sequences producing a plurality of quality check indication signals, one each for the plurality of different rates, the quality check indication signals indicating a probability that the data rate of the received signal is the data rate at which the particular decoded bit sequence was decoded;

a validation circuit receiving the quality check indication signals and developing a first signal indicative of which quality check indication signals indicate a high probability that the data rate of the received signal is the data rate at which the particular decoded bit sequence was decoded; and a rate determination block receiving the plurality of correlation metrics and the first signal, comparing, with threshold values, correlation metric ratios of only the correlation metrics whose corresponding quality check indication signal indicates a high probability that the data rate of the received signal is the data rate at which the particular decoded bit sequence was decoded, and developing a second signal assigning the received signal a data rate based on said comparison.

* * * * *